United States Patent [19]

Peterson

[11] Patent Number: 5,048,997

[45] Date of Patent: Sep. 17, 1991

[54] FLEXIBLE CORNERPIECE FOR SPACER FRAME FOR INSULATED GLASS PANEL

[75] Inventor: Larry W. Peterson, Everett, Wash.

[73] Assignee: Alumet Mfg. Inc., Marysville, Wash.

[21] Appl. No.: 394,736

[22] Filed: Aug. 16, 1989

[51] Int. Cl.[5] .......................... F16B 7/00; F16B 12/00

[52] U.S. Cl. ...................................... 403/295; 52/656; 52/790

[58] Field of Search .................. 403/295; 52/172, 631, 52/790, 656

[56] References Cited

U.S. PATENT DOCUMENTS

| | | | |
|---|---|---|---|
| 2,989,788 | 6/1961 | Kessler | 403/295 |
| 3,269,455 | 8/1966 | Gillotti | 403/295 |
| 3,866,380 | 2/1975 | Benson | 403/231 |
| 4,011,706 | 3/1977 | Dupree | 403/231 |
| 4,105,348 | 8/1978 | Anderson et al. | 403/295 |
| 4,222,209 | 9/1980 | Peterson | 403/295 |
| 4,357,744 | 11/1982 | McKenzie et al. | 403/295 |
| 4,453,855 | 6/1984 | Richter et al. | 52/202 |
| 4,530,195 | 7/1985 | Leopold | 52/172 |
| 4,683,634 | 8/1987 | Cole | 52/790 |
| 4,822,205 | 4/1989 | Berdan | 403/402 |

FOREIGN PATENT DOCUMENTS

| | | | |
|---|---|---|---|
| 2077833 | 12/1981 | United Kingdom | 52/790 |

*Primary Examiner*—Michael Safavi

*Attorney, Agent, or Firm*—Christensen, O'Connor, Johnson & Kindness

[57] ABSTRACT

In a spacer frame for use in separating panes of glass of an insulated glass panel, a cornerpiece has first and second arms joined by a flexible hinge to permit angular movement of said arms with respect to one another. The first and second arms each have a first portion that has a cross-sectional area substantially equal to the cross-sectional area of a spacer bar into which they are inserted, and a second portion that protrudes from the spacer bar that is of a cross section larger than said first portion to form a shoulder that is adjacent and abutting the end of the spacer bar. The shoulder is substantially continuous around its perimeter to substantially eliminate moisture paths from outside said spacer bar to the interior of the spacer bar. The folded corner presents an essentially solid mass that prevents moisture from entering the spacer bar. The cornerpiece also includes an angled projection that extends from a first end of the first arm and a slot formed in the first end of the second arm, the projection and slot cooperating with one another to form an interference fit that releasably holds the first and second arms in a desired angular relationship. A first surface of each of said first and second arms has a series of sawtooth-like serrations formed thereon that interferes with an interior surface of the spacer bar to aid in maintaining the arm in the spacer bar.

4 Claims, 1 Drawing Sheet

FLEXIBLE CORNERPIECE FOR SPACER FRAME FOR INSULATED GLASS PANEL

BACKGROUND OF THE INVENTION

The present invention relates to frames for insulated glass panels and, in particular, to a cornerpiece for connecting the discrete sections of the frame.

It is well known in the art to provide a window having more than one pane of glass, the panes being separated by an air space. Such windows are known as insulating windows or insulated glass panels by virtue of the fact that the air trapped within the space between the panes of glass serves as an insulator to reduce heat flow through the glass. Typically the panes of glass are separated by a frame comprised of sections of tubing joined together at adjacent ends to form a continuous frame. The frame lies between the panes of glass and extends around the perimeter of the window panes. The tubes, also known as spacer bars, are commonly made of aluminum or steel. In order to prevent the window panes from fogging, it is necessary to keep the air that is trapped between the window panes as dry as possible. A desiccant, for example, silica gel, is oftentimes placed in the spacer tubes to absorb moisture from the air trapped within the space between the window panes. In order to prevent the desiccant from settling to the bottom of the tubular spacer frame when the window is in an upright position, it is necessary to block the ends of the sections of spacer bar to keep the desiccant within the separate sections of the spacer. It is also necessary to block the ends of the spacers to prevent the desiccant from entering the space between the window panes, causing an unsightly appearance.

Earlier cornerpieces were constructed of aluminum or zinc. However, in recent years, to take advantage of lower costs of materials and fabrication, cornerpieces of plastic or nylon have become more common. One such cornerpiece is shown in U.S. Pat. No. 4,530,195 to Leopold issued July 23, 1985. Leopold shows a flexible cornerpiece that has a latching means so that when the corner is formed to its final configuration it is securely latched into position and cannot be unbent without exertion of some substantial force on the corner. It has been found that such positive latching is unnecessary and it is sufficient if the cornerpiece can be temporarily maintained in an angled position during initial construction of the frame. Once the frame is sealed into the final position between the glass panes, the sealant maintains the frame in its correct orientation and configuration without the need for latching of the cornerpiece. It is also desirable to eliminate any moisture path from the end of spacer bar that is provided by seams or voids in the cornerpiece.

SUMMARY OF THE INVENTION

The present invention provides a flexible cornerpiece for use in the construction of a spacer frame for insulated glass panels that includes a first and second arm adapted for insertion into the ends of adjacent spacer frames to join the spacer frames together. The two arms are connected by a flexible joint area bendable to place the spacer bars into the correct desired angular relationship depending on the final shape of the frame. The first arm includes an angled slot, and the second arm includes a cooperatively angled finger formed for insertion into the slot. The angularity of the slot and finger provides sufficient resistance to releasably maintain the arms at a predetermined angle temporarily but allows enough freedom of movement to easily unbend the arms. A first surface of each of the first and second arms has a series of serrations or sawtooth-like projections formed thereon that interact with the seam of the spacer bar to provide interference to removal of the arm from the spacer bar once insertion has been made. At least a first portion of each of the first and second arms are of a cross section substantially equal to the cross section of the interior of the spacer bar to block the cross section of the spacer bar, thereby preventing the escape of desiccant within the spacer bar. A second portion of each of the first and second arms is of a larger cross section than the first portion and forms a shoulder at the transition of the first to the second portion. The shoulder acts as a stop and abuts the end of the spacer bar when the arms are inserted into the bar. The first and second arms are constructed so that there are substantially no voids from the shoulder to the apex of the corner when in the folded position. The essentially solid configuration of the folded corner substantially eliminates the moisture paths into the spacer bar.

BRIEF DESCRIPTION OF THE DRAWINGS

The above-stated features and advantages of the invention will be better understood by one of ordinary skill in the art, upon reading the ensuing specification taken in conjunction with the appended drawings, wherein.

DETAILED DESCRIPTION OF THE PREFERRED EMBODIMENT

Figure 1:
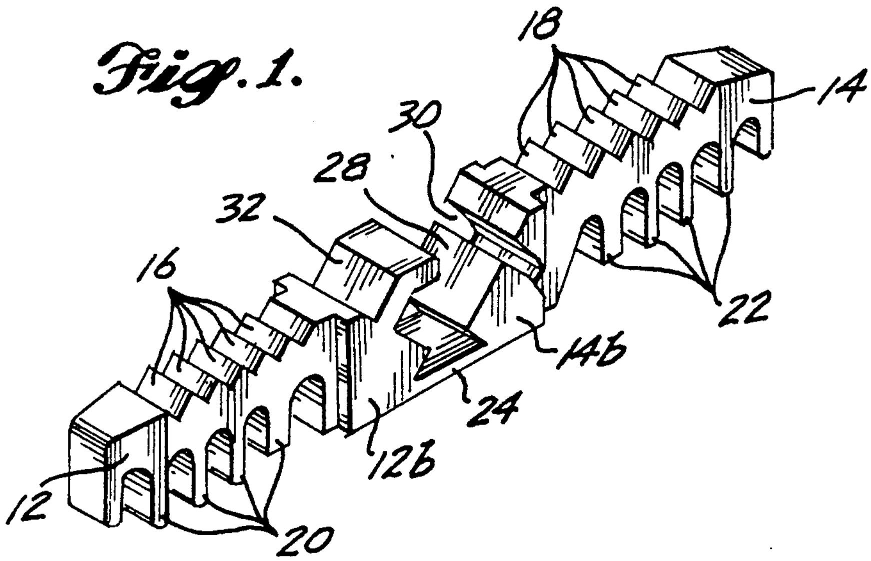
FIG. 1 is an isometric view of a flexible cornerpiece made in accordance with the principles of the present invention.
Figure 3:
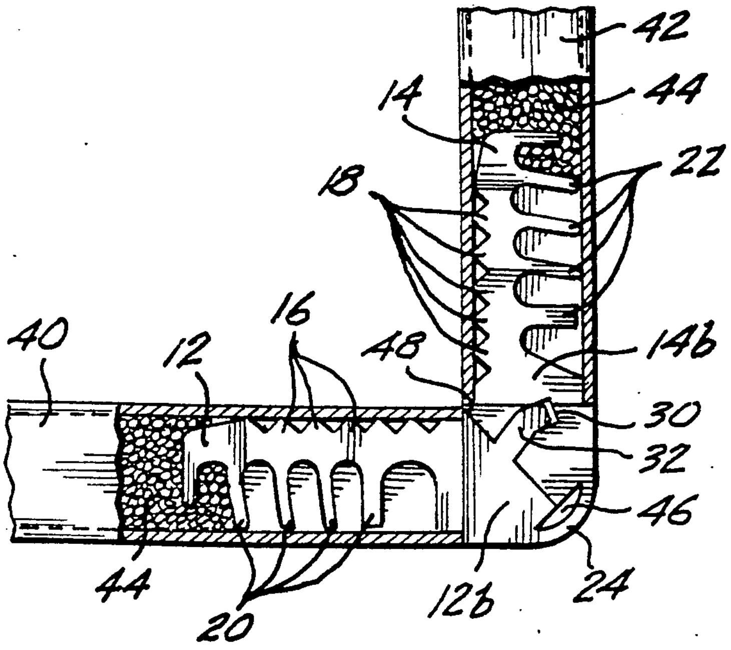
FIG. 3 is a side elevational view in cross section of the cornerpiece and spacer bar assembly of FIG. 2 formed at right angles.

A preferred embodiment of a flexible cornerpiece made in accordance with the present invention is shown in FIG. 1. The cornerpiece is shown in its unflexed state and includes a first arm 12 that extends in a first direction and a second arm 14 that extends in the opposite direction. The arms 12 and 14 each have a substantially rectangular cross section and a first surface of each of the arms is formed with a series of serrations 16 and 18, respectively, which give the surfaces of the arms a sawtooth appearance. A series of tabs 20 protrudes orthogonally from the second surface of the first arm opposite the serrations 16 and a similar set of tabs 22 extends orthogonally from the second surface of the second arm 14 in the direction opposite the serrations 18. A first end 12*a* and 14*a* of each arm is tapered to provide a lead-in that eases the insertion of the arm into its respective spacer bar, as discussed below. The first and second arms are connected by a hinge piece 24 that is contiguous with a second end 12*b* and a second end 14*b* of the first and second arms, respectively. Each of the second ends 12*b* and 14*b* of the first and second arms has a joint face 26 and 28, respectively, formed thereon, which is angled obliquely to the respective first surfaces of the first and second arms. The angle of the joint faces 26 and 28 is such that when the cornerpiece is flexed into its desired angularity, for example, as shown in FIG. 3, the joint faces abut one another holding the corner at the desired minimum angle.

An angled slot 30 is formed in the joint face 28 of the second arm 14 and a finger 32 extends from the joint face 26 of the first arm. The finger 32 has first and second portions angled with respect to one another to form a corner 34. The finger 32 is cooperatively formed with the slot 30, which has a corner 36 formed by angled adjacent slot portions so that when the cornerpiece is flexed into its desired angularity, as shown in FIG. 3, the finger 32 engages the slot 30. The corner 36 of slot 30 provides an interference fit at the corner 34 of the finger 32 to hold the finger loosely in place when the finger is inserted into the slot.

Figure 2:
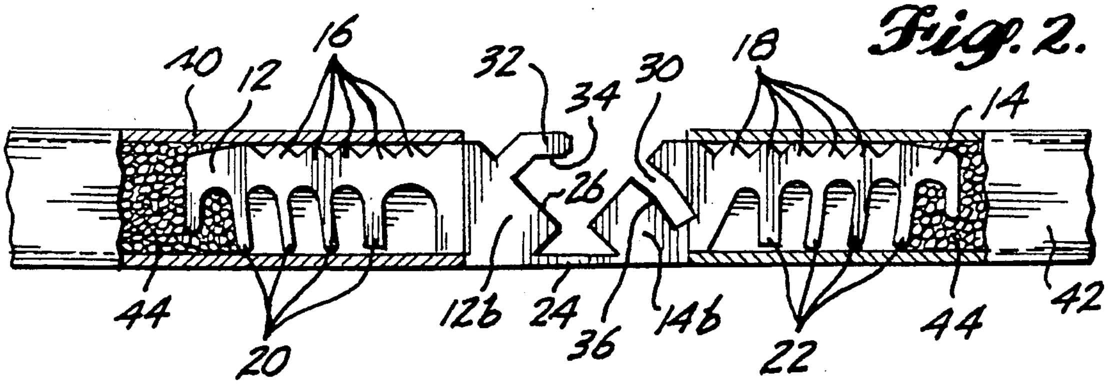
FIG. 2 is a side elevational view in cross section of the cornerpiece of FIG. 1 engaging adjacent spacer bars.

FIG. 2 shows the cornerpiece of FIG. 1 with the respective first and second arms 12 and 14 inserted into spacer bars 40 and 42, respectively. Spacer bars are typically aluminum or steel tubes having an interlocking seam on their upper surface that is engaged by the first surface of the first arm 12. The serrations 16 form an interference fit with the interlocking seam of the spacer bar 40 to assist in holding the cornerpiece into the spacer bar. Some type of desiccant 44 is placed within the spacer bar and the cornerpiece arms are sized cooperatively with the size of the spacer bar to fill the spacer bar and block the exit of desiccant 42 from the end of the spacer bar. While the blocking can be accomplished by a solid arm, the tabs 20 perform the function adequately and utilize less material than a solid corner. The second arm 14 of the cornerpiece fits into the spacer bar 42 in the same manner and the tabs 22 block the flow of desiccant 44 from the second spacer bar 42. A second portion of the arm 12 adjacent the hinge 24 has a larger cross section than the remaining portion of the arm. A shoulder 25 is formed at the transition from the second portion of the arm to the remaining portion of the arm.

The shoulder 25 abuts the end of the spacer bar 40 when the arm 12 is inserted into the bar and the shoulder 25 acts as a stop to prevent the arm 12 from being inserted too far into the bar. A similar shoulder 27 is formed on the second arm 14 and abuts the end of the spacer bar 42 and also acts as a stop to prevent the arm 14 from being inserted too far into the spacer bar 42.

FIG. 3 shows the cornerpiece in its final desired angularity as would be found in a finished frame for an insulated glass panel. It can be seen that the finger 32 is engaged in the slot 30 holding the cornerpiece loosely in its configuration. The angularity of the finger 32 is sufficient to loosely hold the cornerpiece in that position, however, the fit is not so secure that the spacer bars cannot be moved back to their in-line position and maintenance of the cornerpiece in its final desired configuration is actually accomplished by the sealing material that is used to seal the spacer frame and glass and not by the action of the finger 32 and the slot 30.

It can be seen that the design of the joint area of the cornerpiece provides only a small void 46 when the cornerpiece is bent. The void 46 is well outside the ends of the spacer bar. The only seam that runs from outside the spacer bar to inside the bar is a small portion of the slot 30 that extends beyond the shoulder 27. The configuration of the cornerpiece minimizes the paths for moisture from outside the frame to the inside of the spacer bar. The only other seam to be found in the corner is the seam 47 along the abutment of the joint faces 26 and 28 that runs from the inside corner 48 of the frame to the void 46 and does not penetrate into the area within the spacer bar.

It will be understood by those of ordinary skill in the art and others that changes can be made to the foregoing configuration while remaining within the spirit and scope of the present invention. Therefore, the invention is to be defined solely with reference to the appended claims.

The embodiments of the invention in which an exclusive property or privilege is claimed are defined as follows:

1. A cornerpiece for joining adjacent tubular spacer bars in a spacer frame for an insulated glass panel, said cornerpiece comprising:

a first arm adapted to be inserted into an end of one of the adjacent spacer bars;

a second arm adapted to be inserted into an end of another of the adjacent spacer bars;

a flexible joint means connecting said first and second arms at their respective first ends, said joint means comprising a continuous planar member with a width equal to the width of said first and second arms; and a projection extending from said first end of said first arm, said projection including a first portion extending from said arm and a second portion extending obliquely from said first portion, each of said first and second portions having parallel, spaced first and second surfaces, said surfaces cooperating to form spaced, parallel exterior and interior corners at the junction of said first and second portions, said projection cooperatively engaging a slot formed in said first end of said second arm, said slot including first and second parallel, spaced walls, each of said first and second walls having first and second portions that cooperate to form parallel corners substantially equal to the parallel corners of said projection to provide an interference fit between said corners of said slot and the corners of said projection to releasably maintain said first and second arms at a predetermined angle.

2. The cornerpiece of claim 1, wherein said first and second arms, said flexible joint means, and said projection contiguously formed of a single piece of plastic material.

3. The cornerpiece of claim 1, wherein said slot extends across the entire width of said second arm.

4. The cornerpiece of claim 3, wherein said angled projection extends across the entire width of said first arm.

* * * * *

UNITED STATES PATENT AND TRADEMARK OFFICE

CERTIFICATE OF CORRECTION

PATENT NO. : 5,048,997

DATED : September 17, 1991

INVENTOR(S) : Larry W. Peterson

It is certified that error appears in the above-identified patent and that said Letters Patent is hereby corrected as shown below:

| COLUMN | LINE | |
|---|---|---|
| 4 | 52 | insert --are-- before contiguously |
| 4 | 56 | delete "angled" |

Signed and Sealed this

Sixth Day of April, 1993

*Attest:*

STEPHEN G. KUNIN

*Attesting Officer*

*Acting Commissioner of Patents and Trademarks*